United States Patent [19]

Rakieski

[11] Patent Number: 4,827,596
[45] Date of Patent: May 9, 1989

[54] PLASTIC COATING PROCESS FOR PIPE COUPLINGS

[75] Inventor: Kenneth E. Rakieski, Gifford, Pa.

[73] Assignee: Dresser Industries, Inc., Dallas, Tex.

[21] Appl. No.: 88,426

[22] Filed: Aug. 24, 1987

[51] Int. Cl.⁴ ............................................... B23P 25/00
[52] U.S. Cl. ........................................ 29/458; 29/460; 29/527.2
[58] Field of Search ................ 29/458, 460, 527.2; 285/53, 55

[56] References Cited

U.S. PATENT DOCUMENTS 3,675,950 7/1972 Beene .
3,915,478 10/1975 Al et al. .
3,944,262 3/1976 Stiner et al. ........................... 285/53
4,066,283 1/1978 Struck .................................... 285/53
4,296,950 10/1981 Chamberlin .

Primary Examiner—Timothy V. Eley

[57] ABSTRACT

An improved method of coating a pipe coupling with a corrosion resistant polymeric coating includes coating an entire coupling, then simultaneously forming an upstanding flange on the coupling body when, in the parting process, the body and nut are separated. The improved coupling is adapted to utilize a moisture barrier between the nut and the flange.

11 Claims, 1 Drawing Sheet

PLASTIC COATING PROCESS FOR PIPE COUPLINGS

TECHNICAL FIELD

This invention relates to plastic coating processes and more particularly to the process of coating pipe couplings for underground service.

BACKGROUND ART

Sections of pipe may be joined with a coupling. Metallic couplings are strong and reliable, but they are subject to corrosion when utilized to join pipe which is buried underground. To prevent corrosion, plastic coating methods have been developed. Conventional plastic coating technology requires that coupling parts be individually coated, trimmed and later assembled into their final configuration. The need for individual fixtures and trimming operations makes the conventional plastic coating process costly.

SUMMARY OF THE INVENTION

It is therefore an object of the present invention to provide a method of coating a pipe coupling with a corrosion resistant plastic, which is less complex and more cost effective than the conventional technology.

These and other objects of the present invention are met by providing a plastic coating process which includes assembling at least one cylindrical coupling body having exterior threads at at least one end, a nut threadedly engaged with the coupling body exterior threads, and a mandrel passing concentrically through the nut and body. The assembled fixture is introduced into a liquified plastic. The assemblies are then removed from the liquid plastic and cured in an oven. The assemblies are rotated about the axis of the mandrel while still warm. The rotating assemblies are then trimmed, partitioned and disassembled. In one embodiment, the trimming process forms an integral flange. A gasket may be interposed between nut and flange.

DETAILED DESCRIPTION

Figure 1:
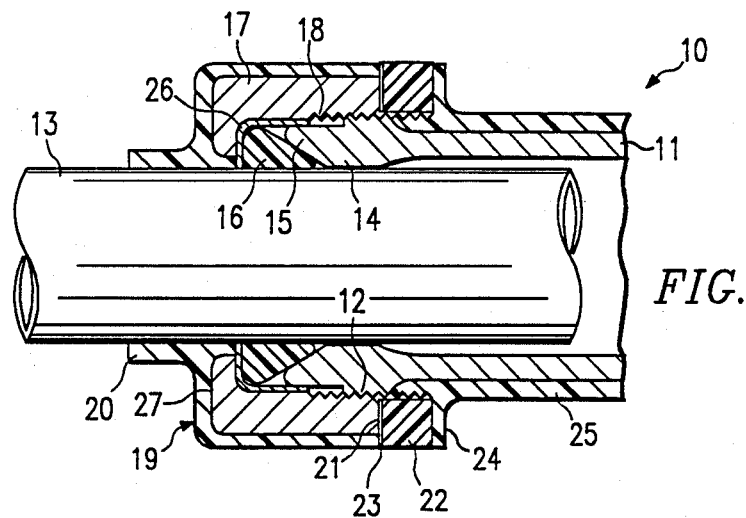
FIG. 1 is a cross section of a plastic coated metallic coupling manufactured in accordance with the teachings of the present invention.

FIG. 1 illustrates a coupling 10 manufactured in accordance with the teachings of the present invention. The components of the coupling include a body 11 having a threaded portion 12 at one or both ends. The coupling body is intended to restrain the lateral movement of a pipe 13 about which it is assembled with the provision of an optional pilot surface 14. A tapered portion 15 of the body engages a sealing gasket 16. A nut 17 having internal threads 18 and interior face 21, engages the external threads 12 of the coupling body. As the assembly has been coated with a P.V.C. or Plastisol brand coating, the nut has an exterior plastic layer 19. The coating on the nut includes an integral collar 20.

Formed into the exterior coating 25 of the body 11, as a result of the coating and parting process, is an upstanding flange 24. A corrosion ring 22, made from sponge rubber or a similar resilient polymer and having a mylar face 23 is bonded to the flange 24. The ring 22 acts as a moisture barrier. The mylar serves to inhibit seal extrusion, abrasion and friction.

Figure 2:
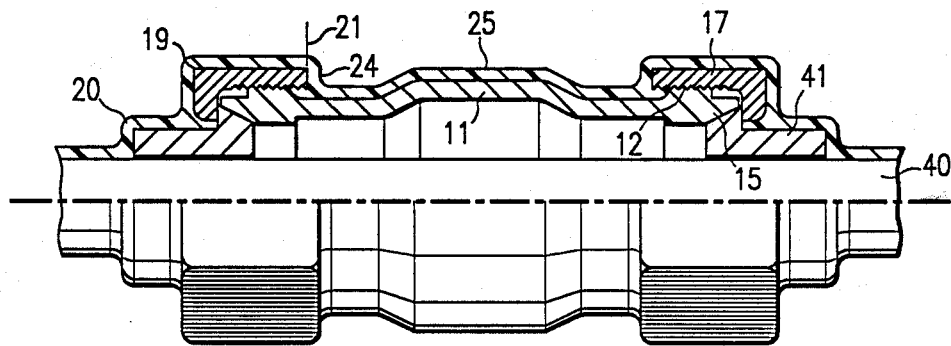
FIG. 2 is a partial cross section of the coupling shown in FIG. 1. The coupling is shown mounted upon a mandrel, after coating, but before trimming.

The coupling shown in FIG. 1 is manufactured according to the following method. As shown in FIG. 2 a mandrel is prepared upon which one or more couplings are assembled end to end. When couplings are assembled on the mandrel, sealing gaskets 16 and gasket retainers 26 are omitted, as is the corrosion ring 22, 23. Two or more couplings may be assembled in an end to end relationship on a single mandrel 40. A masking 41 is employed which supports the body from the inside. Sufficient space must be left between couplings on the mandrel to allow a suitable collar 20 to remain after subsequent trimming operations. The coupling nuts 17 are then advanced on the coupling bodies 11 to a predetermined depth. One or more couplings assembled on a mandrel are then dipped into a P.V.C. or Plastisol brand coating or other liquid polymer solution. The assemblies are rotated to promote even distribution of the plastic coating. The assemblies are removed from the coating bath and are moved to a curing oven. After curing, the couplings undergo a trimming operation while still warm and rubbery. It is necessary to part the coupling body and nut and trim excess material from the collar. The coupling is rotated about its axis and excess material is trimmed from the collar 20. The nut is separated from the body by introducing a blade along the interior face of the nut 21. In this way the coupling components are parted and the body flange 24 is simultaneously formed. When the parts have cooled the corrosion ring 22 including the thin plastic ring 23 may be applied, either separately or as an assembly.

Figure 3:
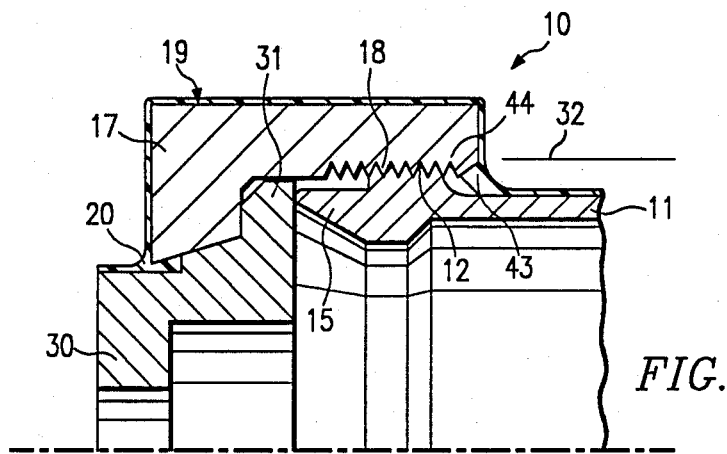
FIG. 3 is a partial cross sectional view of a plastic coated coupling made in accordance with further teachings of the present invention, shown mounted with a masking, before trimming.

The coupling shown in FIG. 3 is coated by assembly on a mandrel in a fashion similar to that described with respect to the coupling of FIG. 1. In FIG. 3 it can be seen that a nut masking 30 has been utilized, permitting the use of a smaller mandrel. The nut masking 30 also includes a spacer portion 31 which is used to pre-position the nut with respect to the coupling body 11. After curing and while still warm the nut and body as shown in FIGURE 2 are parted by the movement of a blade axially along a radius 32 which is equal to one-half the major diameter of the exterior threads 12 of the coupling body 11. In using this method, a flange is not formed on the coupling body. As in the coupling described with reference to FIGS. 1 and 2, plastic threads 43 may be formed in place, if desired, at the same time that the coating is formed. To form a plastic thread for sealing engagement with the nut 17, extra threads 14 are provided on the nut. Mold release agents or the absence of primer insure that the plastic teeth do not adhere excessively after being formed.

While we have described above the principles of the invention in connection with specific process steps and equipment, it is to be clearly understood that this description is made only by way of example and not as a limitation to the scope of our invention as set forth in the objects thereof and in the accompanying claims.

What is claimed is:

1. An improved method for manufacturing plastic coated couplings, the improvement comprising:
   dipping a coupling body having at least one nut attached thereto in a liquified polymer; and parting the nut from the body so as to form in one cutting operation, both a parting line and a flange on the body whereby the coated coupling comprises the aforesaid nut and said coupling body.

2. The method of claim 1, wherein:
after the nut is partitioned from the body, an annular moisture barrier is adhesively applied to the flange, the barrier adapted to seal against the nut.

3. In a method for plastic coated coupling manufacture, the improvement comprising:
asembling a coupling on a mandrel, the coupling including a body and a nut having an interior face;
dipping the assembly of coupling and mandrel into a liquified polymer;
removing excess polymer from the coupling while it is still warm and rubbery; and
inserting a blade into the still rubbery polymer coating at a parting line which is co-planar to the interior face of the nut, simultaneously forming an integral flange on the body, the flange having at least one face parallel to the interior face of the nut.

4. The method of claim 3, wherein:
the integral flange on the body is provided with a resilient polymeric corrosion ring.

5. The method of claim 4, wherein:
removing excess polymer from the coupling includes the step of forming an integral collar on the nut.

6. The method of claim 4, wherein:
the corrosion ring is applied to the integral flange.

7. The method of claim 4, wherein:
the corrosion ring is resilient and has affixed thereto a plastic film.

8. The method of claim 4, wherein:
the coated couplings are oven cured after removal from the liquified polymer.

9. In a method for plastic coated coupling manufacture, the improvement comprising:
assembling a coupling on a mandrel, the coupling including a body having exterior threads and a nut having an interior face;
dipping the assembly of coupling and mandrel into a liquified polymer;
removing excess polymer from the coupling while it is still warm and rubbery; and
inserting a blade into the rubbery coating adjacent the interior face of the nut along a radius of the coupling substantially equal to one-half the major diameter of the external threads formed on the body.

10. The method of claim 9, wherein:
removing excess polymer from the coupling includes the step of forming an integral collar on the nut.

11. The method of claim 9, wherein assembling one or more couplings on a mandrel further comprises the steps of:
selecting a nut masking; and
inserting the nut masking in the assembly;
advancing the nut onto the body until the body contacts the masking thereby establishing a preselected axial relationship between nut and body.

* * * * *